(12) United States Patent
Sadahiro et al.

(10) Patent No.: US 6,467,337 B2
(45) Date of Patent: *Oct. 22, 2002

(54) DEVICE FOR CALCULATING CRUISING RANGE AND METHOD THEREFOR

(75) Inventors: Takashi Sadahiro, Tokyo (JP); Masahiro Shimizu, Tokyo (JP); Michiyasu Nounen, Tokyo (JP); Mikio Araki, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,662
(22) PCT Filed: May 29, 1998
(86) PCT No.: PCT/JP98/02392
§ 371 (c)(1),
(2), (4) Date: Oct. 8, 1999
(87) PCT Pub. No.: WO99/63215
PCT Pub. Date: Dec. 9, 1999

(65) Prior Publication Data
US 2002/0032540 A1 Mar. 14, 2002

(51) Int. Cl.[7] ................................. G01F 9/00
(52) U.S. Cl. .................. 73/113; 340/450.2; 701/123
(58) Field of Search ..................... 73/113, 114, 112, 73/115; 701/123; 340/438, 439, 450.2

(56) References Cited

U.S. PATENT DOCUMENTS

| 4,570,226 A | * | 2/1986 | Aussedat | 73/113 |
| 4,845,630 A | * | 7/1989 | Stephens | 73/114 |
| 5,148,702 A | * | 9/1992 | Gulick, Jr. | 73/114 |
| 5,301,113 A | * | 4/1994 | To et al. | 73/114 |
| 5,913,917 A | * | 6/1999 | Murphy | 73/114 |
| 5,916,298 A | * | 6/1999 | Kroiss et al. | 73/114 |
| 5,995,886 A | * | 11/1999 | Tanaka et al. | 73/114 |

FOREIGN PATENT DOCUMENTS

| JP | 54-108322 | 8/1979 |
| JP | 54-111373 | 8/1979 |
| JP | 58-2709 | 1/1983 |
| JP | 59-135412 | 9/1984 |
| JP | 61-94719 | 6/1986 |
| JP | 61-193999 | 8/1986 |
| JP | 61-215921 | 9/1986 |
| JP | 61-178014 | 11/1986 |
| JP | 61-277019 | 12/1986 |
| JP | 63-25517 | 2/1988 |
| JP | 64-61615 | 3/1989 |
| JP | 1-257222 | 10/1989 |
| JP | 2-141899 | 5/1990 |
| JP | 3-130516 | 12/1991 |
| JP | 4-131715 | 5/1992 |
| JP | 5-34185 | 2/1993 |
| JP | 7-286549 | 10/1995 |
| JP | 8-218962 | 8/1996 |
| JP | 9-216541 | 8/1997 |
| JP | 10-61514 | 3/1998 |

* cited by examiner

Primary Examiner—Eric S. McCall
(74) Attorney, Agent, or Firm—Sughrue Mion, PLLC

(57) ABSTRACT

A remaining fuel Z is calculated by subtracting a fuel injection amount J supplied to an engine 14 from stored fuel F measured by a fuel meter 12. A fuel economy Fm is calculated by dividing a running distance M of a vehicle by a fuel injection amount J. A cruising distance K is calculated by multiplying the remaining fuel Z and the fuel economy Fm.

19 Claims, 3 Drawing Sheets

DEVICE FOR CALCULATING CRUISING RANGE AND METHOD THEREFOR

FIELD OF THE INVENTION

The present invention relates to a device for calculating a cruising range of a vehicle and a method therefor.

BACKGROUND TO THE INVENTION

FIG. 1 shows a conventional cruising range calculation device (hereafter range calculator). In the figure, reference numeral 1 denotes a fuel tank which stores fuel, 2 is a fuel meter which measures a stored amount of fuel F in the fuel tank 1, 3 is an A/D converter, 4 is an operational distance calculator which measures an operational distance M by counting vehicle speed pulses P, 5 is a calculator which calculates a fuel economy Fm by dividing an operational distance M calculated by the operational distance calculator 4 by a fuel consumption amount Q and which calculates a range K by multiplying a fuel amount F measured by the fuel meter 2 by the fuel economy Fm, 6 is a display which displays a range K calculated by the calculator 5.

Then operation of the device will be described below.

Firstly the fuel meter 2 calculates a fuel amount F in the fuel tank 1 in real time and outputs a measurement result to the A/D converter 3.

On receipt of the measurement result from the fuel meter 2, the A/D converter 3 A/D converts the signal and outputs a measurement result to the calculator 5.

Alternatively, the operational distance calculator 4 counts the number of vehicle speed pulses P output by the vehicle after running a fixed distance, multiplies the count number C by a fixed distance D in a sampling period and calculates an operational distance M of the vehicle.

Operational distance $M$=count number $C$ of vehicle speed pulse $P$×fixed distance $D$ The calculator 5 monitors the fuel amount F in the fuel tank 1 based on the measurement result output from the A/D converter 3 and calculates a fuel consumption Q in a sampling period.

fuel consumption $Q$=fuel amount at initiation of sampling period–fuel amount at termination of sampling period The calculator 5 calculates a fuel consumption Q in the sampling period and then calculates a fuel economy Fm by dividing the operational distance M measured by the operational distance calculator 4 by the fuel consumption Q.

fuel economy=operational distance $M$÷fuel consumption $Q$

The calculator 5 calculates the fuel economy Fm in the sampling period and then calculates a range K by multiplying the fuel amount F and the fuel economy Fm.

range $K$=fuel amount $F$×fuel economy Fm

In such a way, when the calculator 5 has calculated a range K, the display 6 displays the range K on an indicator for example.

Apart from the conventional example above, a technique of detecting refueling from the difference between a fuel injection amount supplied to an engine and a stored amount of fuel in a fuel tank is disclosed in JP-A-58-2709.

Since the range calculator is constructed as above, it is possible to accurately calculate a range of a vehicle with a high accuracy measurement by the fuel meter 2. However since the surface of the fuel in the fuel tank 1 develops a movement when the vehicle is running, the accuracy of the measurements of the fuel meter 2 deteriorates. Thus the problem has arisen that it is not possible to accurately measure a range of the vehicle.

The present invention is proposed to solve the above problem and has as its object the provision of a device for calculating a cruising range of a vehicle and a method therefor which can calculate a range of a vehicle with high accuracy even when the surface of liquid fuel in a fuel tank is moving.

DISCLOSURE OF THE INVENTION

The device for calculating a cruising range of the present invention calculates a remaining amount of fuel by subtracting an injected amount of fuel measured by a fuel injection measuring means from a fuel amount measured by said fuel measuring means and which calculates a fuel economy by dividing a running distance measured by said operational distance measuring means by a fuel injection amount.

In this way, even when a movement is generated on the surface of the fuel in the fuel tank, it is possible to accurately calculate a vehicle cruising distance as it is possible to accurately calculate a fuel economy and a remaining fuel in the fuel tank.

The device for calculating a cruising range of the present invention calculates a stored fuel amount in the fuel tank, and then calculates the difference of the remaining fuel calculated by the remaining fuel calculation means and the stored fuel amount. When the difference is greater than a standard value, the fact that refueling is performed in the fuel tank is communicated to the fuel measuring means.

In such a way, even when a movement is generated in the surface of the fuel in the fuel tank, it is possible to detect the supplied amount of fuel accurately.

The device for calculating a cruising range of the present invention measures an inclination of the vehicle and corrects the standard value on the basis of the inclination.

In this way, it is possible to accurately detect refueling even when the surface of the fuel is inclined in the fuel tank when the vehicle is stopped on a sloping road.

The device for calculating a cruising range of the present invention measures a fuel amount when a fixed time has elapsed after the vehicle has stopped.

In this way, it is possible to measure the amount of fuel after the movement of the fuel surface has stabilized. As a result, it is possible to measure the amount of fuel accurately.

The device for calculating a cruising range of the present invention executes the measurement of the fuel amount on a plural number of occasions and thus enables use of an average value of the measurement results as a final measurement value.

In this way, even when a movement in the surface of the fuel is generated, the influence of the movement is reduced and the measurement accuracy of the fuel amount is improved.

The device for calculating a cruising range of the present invention is adapted to detect the category of road currently traveled and to calculate a fuel economy when the category of road varies.

In this way, it is possible to calculate a fuel economy accurately even when the category of road currently traveled varies.

The device for calculating a cruising range of the present invention is adapted to measure a fuel amount in a fuel tank when the vehicle is stationary.

In this way, even when refueling is not performed, it is possible to remeasure the fuel in the fuel tank and as a result it is possible to improve the measurement accuracy of the remaining fuel.

The device for calculating a cruising range of the present invention measures a fuel injection amount supplied to the engine and multiplies a fuel amount measured by the fuel measuring means by the fuel injection amount. Then the result of the multiplication is divided by the remaining fuel calculated by the remaining fuel calculation means and the injection amount is corrected.

In this way, it is possible to suppress rapid variation in the cruising range by suppressing rapid variation in the injection amount.

The device for calculating a cruising range of the present invention is adapted to acquire fuel injection amount through a maintenance communication line from a fuel measurement means.

In this way, it is possible to acquire a fuel injection amount from the fuel measurement means without the need for a new maintenance communication line in the vehicle.

The device for calculating a cruising range of the present invention is adapted to acquire fuel injection amount from a fuel measurement means only when a self-diagnosing tester is not connected to the maintenance communication line.

In this way, when a self-diagnosing tester is connected to the maintenance communication line, it is possible to avoid any impediment to the processing of the self-diagnosing tester.

The method for calculating a cruising range of the present invention is adapted to calculate a remaining fuel amount by subtracting a fuel injection amount supplied to the engine from the fuel stored in the fuel tank, to calculate fuel economy by dividing the vehicle running distance by the fuel injection amount supplied to the engine and to calculate a cruising distance by multiplying the remaining fuel by the fuel economy.

In this way, even when the surface of the fuel in the fuel tank is moving, it is possible to accurately measure a fuel economy and remaining fuel amount in the fuel tank. As a result, it is possible to measure a vehicle cruising distance accurately.

The method for calculating a cruising range of the present invention is adapted to measure stored fuel in the fuel tank and to calculate the difference of stored fuel and remaining fuel. When the difference is greater than a standard value, the device is adapted to detect that fuel supplied to the fuel tank.

In this way, even when the surface of the fuel in the fuel tank is moving, it is possible to accurately detect the supplied amount of fuel.

The method for calculating a cruising range of the present invention is adapted to measure an inclination of the vehicle, and to correct the standard value depending on the inclination.

In this way, even when an inclination is generated in the surface of fuel in the fuel tank when the vehicle is stationary on an incline, it is possible to accurately detect refueling.

The method for calculating a cruising range of the present invention is adapted to a stored amount of fuel after a fixed period has elapsed after the vehicle has stopped.

In this way, after the movement of the fuel surface has decreased, it is possible to measure the stored fuel and as a result, to accurately measure the stored fuel.

The method for calculating a cruising range of the present invention is adapted to execute measurement of stored fuel a plurality of times and to use an average value of the measurement result as a final measurement value.

In this way, even when a movement in the fuel surface is generated, the influence of the movement is reduced and the measurement accuracy of the stored fuel is improved as a result.

The method for calculating a cruising range of the present invention is adapted to detect different road types during running and to calculate a fuel economy when the road type varies.

In this way, even when a road type varies, it is possible to calculate a fuel economy with high accuracy.

The method for calculating a cruising range of the present invention is adapted to measure stored fuel in a fuel tank when the vehicle is stationary.

In this way, even when refueling is not performed, it is possible to remeasure stored fuel in the fuel tank and as a result, to improve the calculation accuracy of the remaining fuel.

The method for calculating a cruising range of the present invention is adapted to measure a fuel injection amount supplied to the engine, to multiply the stored fuel in the fuel tank with the injected amount, to divide the calculation result by the remaining fuel and to correct the injection amount.

In this way, it is possible to suppress rapid variations in the cruising distance by suppressing rapid variations in fuel injection amount.

The method for calculating a cruising range of the present invention is adapted to acquire a fuel injection amount through a maintenance communication line from an engine computer which controls the engine.

In this way, it is possible to acquire a fuel injection amount from an engine computer without the need to provide a new maintenance communication line in the vehicle.

The method for calculating a cruising range of the present invention is adapted to acquire a fuel injection amount from an engine computer only when a self-diagnosing tester is not connected to the maintenance communication line.

In this way, when a self-diagnosing tester is connected, it is possible to avoid any impediment to the processing of the self-diagnosing tester.

PREFERRED EMBODIMENTS OF THE INVENTION

In order to describe the invention in greater detail, the preferred embodiments will be outlined below with reference to the accompanying figures.

Embodiment 1

Figure 2:
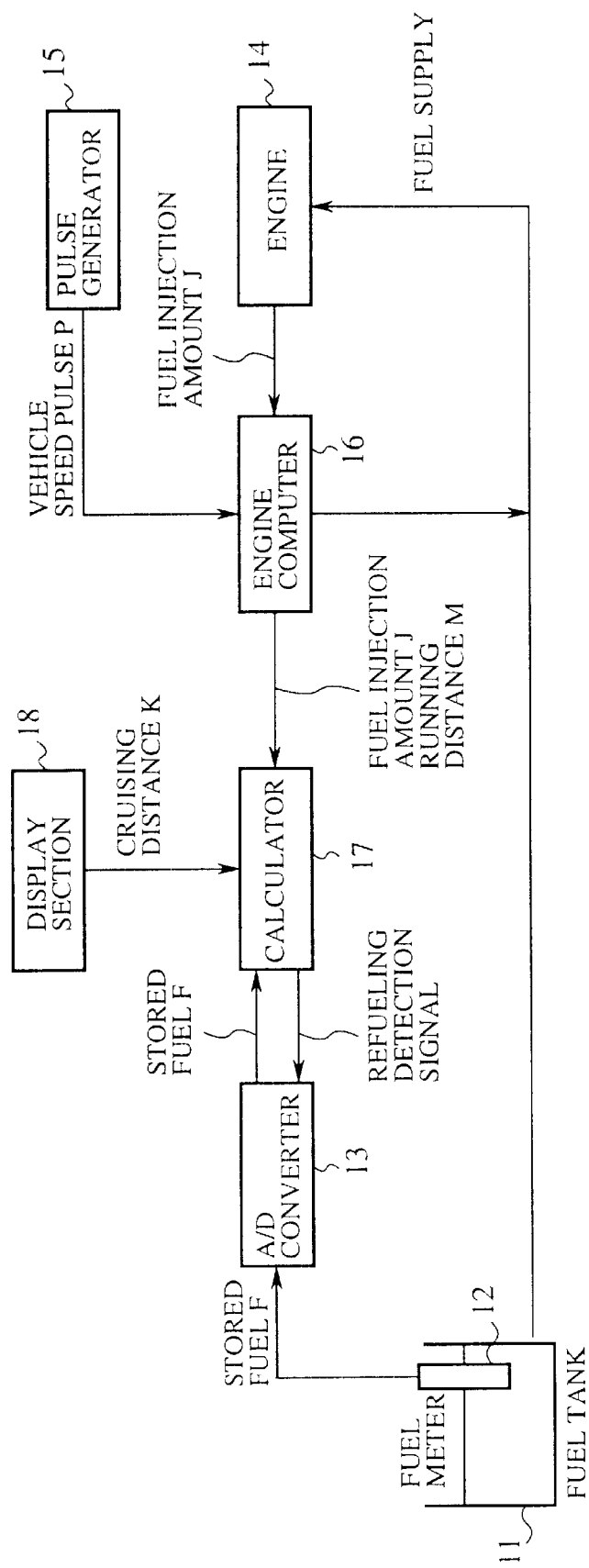
FIG. 2 shows a device for calculating a cruising range according to embodiment 1 of the present invention.

FIG. 2 shows a device for calculating a cruising range according to embodiment 1 of the present invention. In the figure, 11 is an engine tank which stores fuel supplied to the engine 14, 12 is a fuel meter (fuel measuring means) which measures stored fuel F in the fuel tank 11, 13 is an A/D converter which A/D converts the fuel amount F measured by the fuel meter 12 and which outputs the converted result to a calculation section 17, 14 is a vehicle engine, 15 is a pulse generation apparatus (running distance measurement means) which propagates a vehicle speed pulse P each time the vehicle travels a fixed distance, 16 is an engine computer (injection amount measurement means, running distance measurement means) which measures an injection amount J of fuel supplied to the engine 14 and which measures a traveled distance M by counting the vehicle speed pulses P propagated by the pulse generation means 15.

17 is a calculation section (remaining fuel calculation means, fuel economy calculation means, cruising distance calculation means, refueling detection means) which has the following functions: the function of calculating remaining fuel Z by subtracting the injection fuel amount J output from the engine computer 16 from the stored fuel F output by the A/D converter 13, the function of calculating fuel economy Fm by dividing the running distance M output from the engine computer 16 by the fuel injection amount J, the function of calculating a cruising distance K by multiplying remaining fuel Z and fuel economy Fm, and the function of outputting refueling detection signal when refueling is detected.

Figure 3:
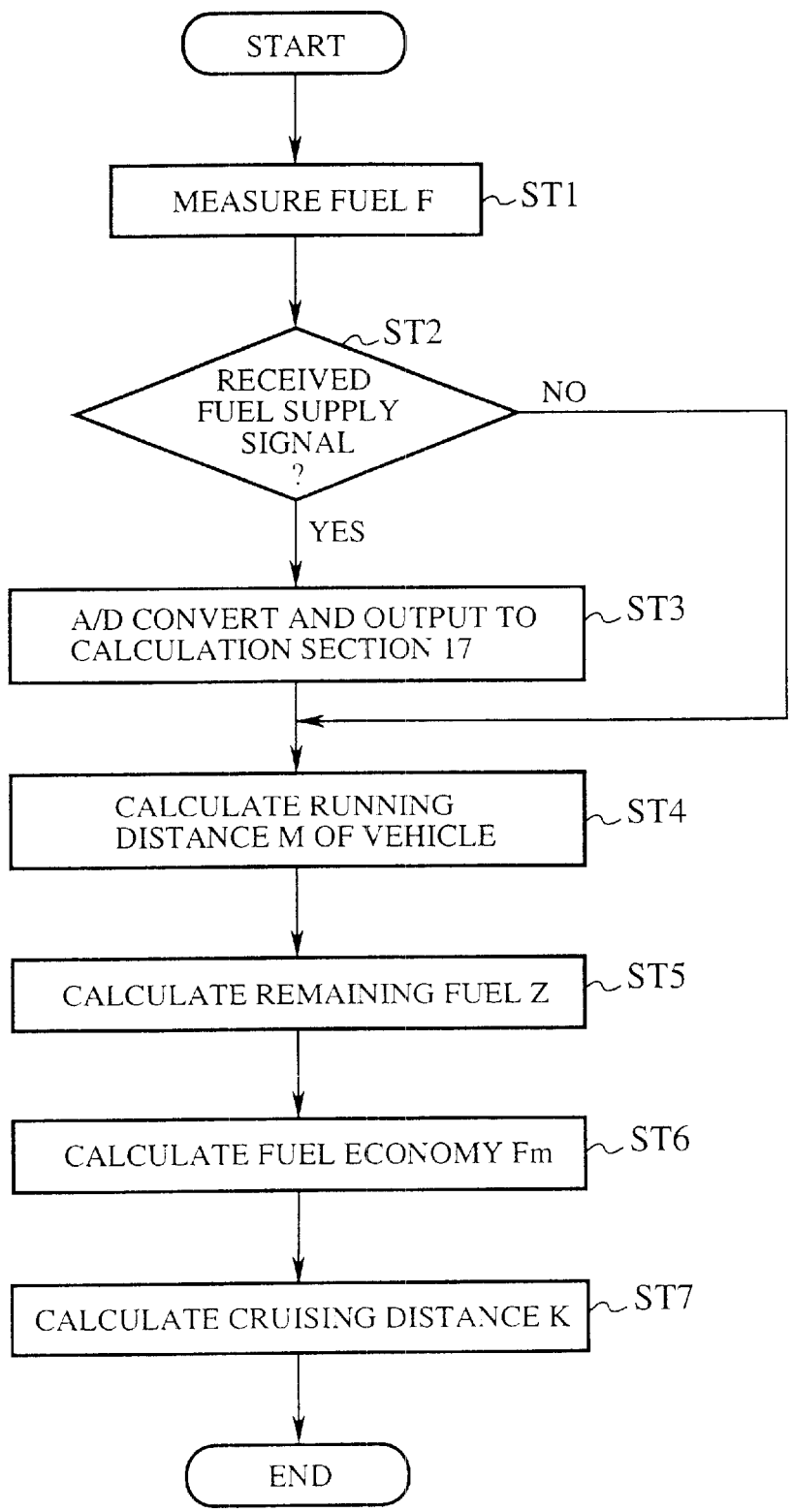
FIG. 3 is a flowchart of a method for calculating a cruising range according to embodiment 1 of the present invention.

FIG. 3 is a flowchart showing a method of calculating a cruising distance according to a first embodiment of the present invention.

The operation of the invention will be described below.

First, the fuel meter 12 measures a stored fuel amount F in the fuel tank 11 in real time (step ST1). The measurement result is output to the A/D converter 13 and the calculation of the remaining fuel Z discussed below uses the measurement result on refueling. Only when a fuel supply signal is received from the calculation section 17 (step ST2), the fuel amount F measured by the fuel meter 12 is A/D converted by the A/D converter 13, and the converted result is output to the calculation section 17 (step ST3).

The engine computer 16 measures an injection fuel amount J of fuel supplied to the engine 14 and counts the number of vehicle speed pulses P propagated each time the vehicle travels a fixed distance. The running distance M of the vehicle is calculated by multiplying a fixed distance D by the count number C (step ST4).

Running distance $M$=count number $C$ of vehicle speed pulse $P$×fixed distance $D$ The calculation section 17 calculates the remaining fuel Z by subtracting the fuel injection amount J from the stored fuel F when the stored fuel F is output from the A/D converter 13 and the fuel injection amount J is output from the engine computer 16 (step ST5). However the calculation section 17 does not receive a new stored fuel F from the A/D converter 13 as long as a refueling detection signal is not output. When a refueling detection signal is not output, remaining fuel Z is calculated on the basis of the stored fuel F value used on the previous occasion.

Remaining fuel $Z$=stored fuel $F$−injected fuel $J$

The calculation section 17 calculates the fuel economy Fm by dividing the running distance M by the fuel injection amount J when the running distance M is output from the engine computer 16 (step ST6).

Fuel economy $Fm$=running distance $M$÷fuel injection amount $J$

The calculation section 17 calculates a cruising distance K by multiplying the fuel economy Fm by the remaining fuel Z when remaining fuel Z and fuel economy Fm have been calculated (step ST7).

cruising distance $K$=fuel economy $Fm$×remaining fuel $Z$

Figure 1:
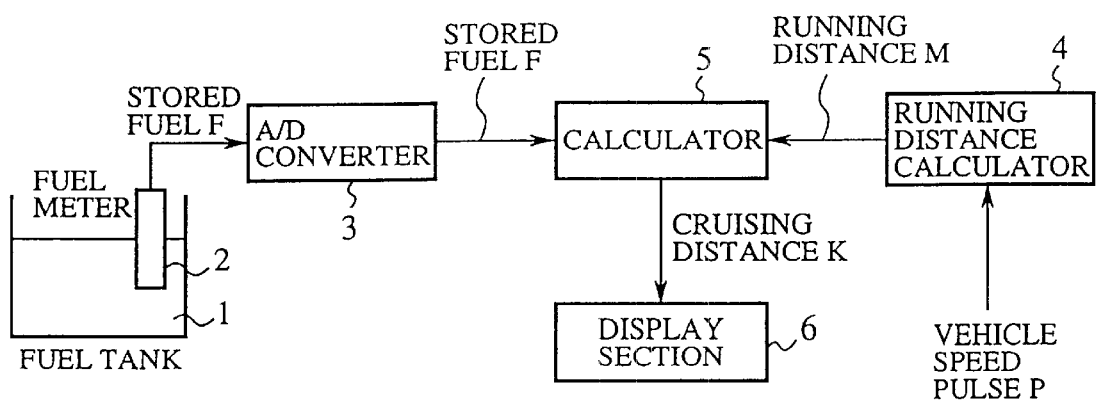
FIG. 1 shows a conventional device for calculating a cruising range.
Figure 4:
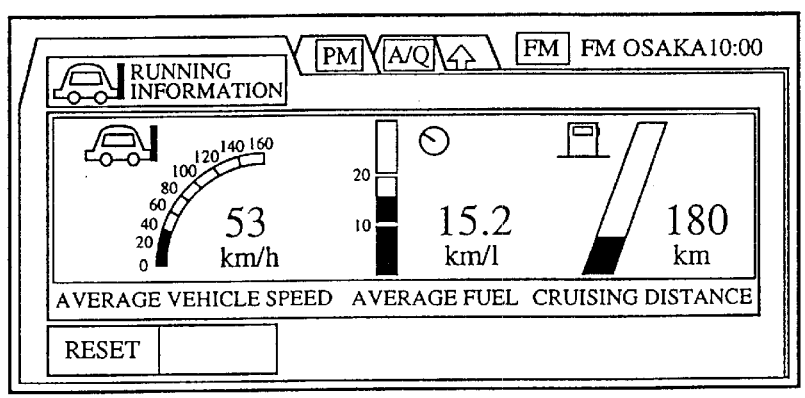
FIG. 4 is a diagrammatic representation of an example of displaying a cruising distance.

As shown in FIG. 4, when the calculation section 17 has calculated the cruising distance K, the display section 18 displays the cruising distance K for example on an indicator.

The refueling detection signal is output from the calculation section 17 when the calculation section detects fuel supply. The calculation section 17 obtains the stored amount of fuel F in the fuel tank 11 through the A./D converter 13 when refueling is detected and calculates the difference between the stored fuel F and the remaining fuel Z. When the difference is larger than a standard value, it is determined that fuel is supplied into the fuel tank 11 and a refueling detection signal is output.

As shown above, according to embodiment 1, the present invention is adapted to calculate remaining fuel Z by subtracting injected fuel J supplied to the engine 14 from the stored fuel F measured by the fuel meter 12. Fuel economy is calculated by dividing vehicle running distance M by the fuel injection amount J. Thus even when surface of the fuel in the fuel tank 11 is moving, it is possible to calculate remaining fuel Z in the fuel tank 11 and fuel economy Fm with high accuracy. As a result, it is possible to calculate a cruising distance K of the vehicle accurately.

Embodiment 2

In embodiment 1, when the difference of stored fuel F and remaining fuel Z is greater than a standard value, supply of fuel to the fuel tank 11 was signaled. However when the vehicle is stationary on an incline, an incline is generated in the surface of the fuel in the fuel tank 11 and a deviation in the measurement of the stored fuel F may be increased.

Thus when stored fuel F in the fuel tank 11 is measured, an incline of the vehicle is measured and the standard value may be corrected on the basis of the incline.

standard value after correction=standard value×(1−vehicle incline×fixed value)

In such a way, even when an incline is generated on the surface of the fuel in the fuel tank as the vehicle is stationary and on an incline, it is possible to detect supply of fuel accurately.

Embodiment 3

In embodiment 1, stored fuel F was described as being calculated on detecting supply of fuel. However, stored fuel F may be measured after a fixed period has elapsed when a vehicle has become stationary.

In this way, after a movement on the fuel surface has stabilized, it is possible to measure stored fuel F. As a result, it is possible to accurately measure stored fuel F.

Needless to say, the measurement of stored fuel F may be performed before the vehicle begins to run.

Embodiment 4

In embodiment 1 above, the number of times that measurement of the stored fuel F was performed was not particularly noted. However measurement of stored fuel F may be performed a plurality of times and an average value of the measurement results may be used as a final measurement result.

In this way, even when a movement is generated on the surface of the fuel in the fuel tank 11, it is possible to reduce the influence of the movement and to improve the measurement accuracy of the stored fuel F.

Embodiment 5

In embodiment 1 above, the calculation timing of the fuel economy Fm was performed was not particularly noted. However since fuel economy Fm may greatly fluctuate depending on operational conditions, when calculating fuel economy in real time, the possibility exists of large variations in the cruising distance K and thus of driver uncertainty.

Generally, each time the vehicle travels several kilometers, an average value of the fuel economy Fm for that period is calculated and, on the basis of that average value, a cruising distance K is calculated.

However for example, since the operational conditions of the vehicle differ greatly when the vehicle is traveling in urban areas in comparison to when running on an expressway, if a fuel economy Fm used on general roads is used to calculate a cruising distance K after entering an expressway from a general road, the measurement accuracy of the cruising distance K will deteriorate.

In embodiment 5, in order to avoid problems such as the above, for example, a currently traveled road type is detected by a navigation device and when the road type changes the calculation section 17 is adapted to recalculate the fuel economy Fm.

In this way, even when currently traveled road type changes, it is possible to calculate fuel economy Fm with high accuracy.

Embodiment 6

In embodiment 1, the A/D converter 13 A/D converts the stored fuel F measured by the fuel meter 12 only when a refueling detection signal is received from the calculation section 17. The converted data is output to the calculation section 17. However when it is detected that the vehicle is stationary, the stored fuel F measured by the fuel meter 12 may be A/D converted and that converted data may be output to the calculation section 17.

In this way, even when fuel is not supplied, it is possible to recalculate the stored fuel in the fuel tank 11 and as a result, improve the accuracy of the calculation of the remaining fuel Z.

Embodiment 7

In embodiment 1, a fuel injection amount J was measured by the engine computer 16. However when the fuel injection amount J varies rapidly, the cruising distance will also vary rapidly as a result.

Since sudden increases in the cruising distance K (for example from 100 km to 130 km) or sudden reductions in the cruising distance (for example from 50 km to 10 km) will alarm the driver, it is desirable that corrections to the cruising distance K are performed gradually.

In embodiment 7, in order to suppress rapid variations in the cruising distance K, when the engine computer 16 computes a fuel injection amount J, the fuel injection amount is corrected as shown below using a stored fuel F when the vehicle is stationary by gradually making up differences between the stored fuel F and remaining fuel Z when the vehicle is stationary.

In other words, the calculation section 17 (correction means) multiplies stored fuel F when the vehicle is stationary as measured by the fuel meter 12 with respect to a fuel injection amount J measured by the engine computer 16 and then divides the result of the multiplication by the remaining fuel amount Z. Thus the fuel injection amount J may be corrected.

Pre-correction fuel injection amount $J$=fuel injection amount $J\times$stored fuel $F$ when vehicle stationary÷remaining fuel amount $Z$.

In this way, it is possible to suppress rapid variations in cruising distance K as rapid variations in fuel injection amount J are suppressed.

Embodiment 8

In embodiment 1 above, the communicating line between the calculation section 17 and the engine computer 16 was not particularly noted. A K line which connects a self-diagnosing tester (the self-diagnosing tester is a device which diagnoses faults in the engine computer when the vehicle is tested) and the engine computer 16 may be used as a communication line.

That is to say, since the K line is not particularly used at times other than when the self-diagnosing tester is connected during vehicle testing, no effect will result on the processing of the self-diagnosing tester even when the K line is used as a communication line during normal vehicle operation.

Thus if the K line is adapted to be used as a communication line, the need for the provision of a new line connecting the engine computer 16 and the calculation section 17 is obviated and it is possible to execute transmission of data regarding fuel injection amount J for example.

However when a K line is connected to the self-diagnosing tester and transmission of data is performed regarding the fuel injection amount using the K line, since the processing of the self-diagnosing tester may be impeded, it is necessary to terminate transmission of data regarding the fuel injection amount for example using the K line when the self-diagnosing tester is connected to the K line.

INDUSTRIAL APPLICATION

As shown above, the cruise distance calculation device and method therefor of the present invention are adapted to provide a driver with a highly accurate cruise distance.

What is claimed is:

1. A cruising distance calculation device provided with
   a fuel measurement means which measures stored fuel in a fuel tank when fuel is supplied to said fuel tank,
   a fuel injection measurement means which measures a fuel injection amount supplied to an engine,
   a running distance measurement means which measures a running distance of a vehicle,
   a remaining fuel calculation means which calculates remaining fuel by subtracting a fuel injection amount measured by said fuel injection measurement means from a stored fuel measured by said fuel measurement means,
   a fuel economy calculation means which calculates a fuel economy by dividing a running distance measured by said running distance measurement means by a fuel injection amount measured by said fuel injection measuring means, a cruising distance calculation means which calculates a cruising distance by multiplying a remaining fuel calculated by said remaining fuel calculation means by a fuel economy calculated by said fuel economy calculation means, and a refueling detection means which measures stored fuel in said fuel tank and calculates the difference between the stored fuel and the remaining fuel calculated by said remaining fuel calculation means, and when said difference is larger than a standard value, said cruising distance calculation means communicates to said fuel measurement means the fact that fuel is supplied into said fuel tank.

2. A cruising distance calculation device according to claim 1 wherein said refueling detection means measures an inclination of said vehicle and corrects said standard value depending on said inclination.

3. A cruising distance calculation device according to claim 1 wherein said refueling detection means measures a stored fuel amount when a fixed time has elapsed after the vehicle has become stationary.

4. A cruising distance calculation device according to claim 3 wherein said refueling detection means executes measurement of stored fuel a plurality of times and uses an average value of such a measurement result as a final measurement result.

5. A cruising distance calculation device according to claim 1 wherein said fuel economy calculation means detects a type of road currently traveled and calculates a fuel economy when said road type changes.

6. The cruising distance calculation device according to claim 1, wherein said fuel measurement means measures the stored fuel in the fuel tank when the vehicle has become stationary.

7. The cruising distance calculation device according to claim 6 comprising a correction means which multiplies a stored fuel measured by said fuel measurement means with a fuel injection amount measured by said fuel injection measurement means and which corrects said fuel injection amount by dividing the result of said multiplication by the remaining fuel amount calculated by said remaining fuel calculation means.

8. A cruising distance calculation device according to claim 1 wherein said remaining fuel calculation means and said fuel economy calculation means obtain a fuel injection amount through a maintenance communication line from said fuel injection measurement means.

9. A cruising distance calculation device according to claim 8 wherein said remaining fuel calculation means and said fuel economy calculation means obtain a fuel injection amount only when a self-diagnosing tester is not connected to said maintenance communication line.

10. A cruising distance calculation method which comprises the steps of measuring stored fuel in a fuel tank when fuel is supplied to said fuel tank, measuring a running distance of a vehicle and a fuel injection amount supplied to an engine, calculating a remaining fuel amount by subtracting a fuel injection amount supplied to said engine from a stored fuel amount in said fuel tank, calculating a fuel economy by dividing a vehicle running distance by a fuel injection amount supplied to said engine, calculating cruising distance by multiplying said remaining fuel and said fuel economy, measuring stored fuel in the fuel tank and measuring a difference between said stored fuel and said remaining fuel, and detecting the fact that fuel is supplied into the fuel tank when said difference is greater than a standard value.

11. The cruising distance calculation method according to claim 10, which comprises the further steps of:

measuring an inclination of said vehicle; and correcting said standard value depending on said inclination.

12. The cruising distance calculation method according to claim 10, which comprises the further step of measuring stored fuel when a fixed period of time has elapsed after the vehicle has become stationary.

13. A cruising distance calculation method according to claim 12 which comprises the further steps of executing the measurement of stored fuel a plurality of times and using an average value of those measurement results as a final measurement result.

14. A cruising distance calculation method according to claim 10 which comprises the further steps of detecting a type of road currently traveled and calculating a fuel economy when said type of road changes.

15. A cruising distance calculation method according to claim 10 which comprises the further step of measuring stored fuel in the fuel tank when said vehicle has become stationary.

16. A cruising distance calculation method according to claim 15 which comprises the further steps of measuring a fuel injection amount supplied to said engine, multiplying stored fuel in said fuel tank by said fuel injection amount, dividing the result of said multiplication by remaining fuel, and correcting said fuel injection amount.

17. A cruising distance calculation method according to claim 10 which comprises the further step of obtaining a fuel injection amount through a maintenance communication line from an engine computer which controls said engine.

18. A cruising distance calculation method according to claim 17 which comprises the further step of obtaining a fuel injection amount from said engine computer only when a self-diagnosing tester is not connected to said maintenance communication line.

19. The cruising distance calculation device according to claim 9, wherein said cruising distance calculation device further comprises a self-diagnosing tester, and said remaining fuel calculation means and said fuel economy calculation means obtain a fuel injection amount only when the self-diagnosing tester is not connected to said maintenance communication line.

* * * * *